United States Patent
Peters et al.

[15] 3,678,191

[45] July 18, 1972

[54] CRT BLANKING AND BRIGHTNESS CONTROL CIRCUIT

[72] Inventors: Robert L. Peters, Sunnyvale; Kenneth F. Koch, San Jose, both of Calif.

[73] Assignee: The United States of America as represented by the Administrator of the National Aeronautics and Space Administration

[22] Filed: Nov. 12, 1968

[21] Appl. No.: 774,691

[52] U.S. Cl. ..........................178/7.5 E, 315/22 R, 315/30 R, 330/27 R

[51] Int. Cl. ..........................H04n 5/14

[58] Field of Search..............315/22, 30; 178/7.5 E; 330/27, 330/76, 78; 307/246, 261, 255; 179/15 AA; 320/1

[56] References Cited

UNITED STATES PATENTS

| | | | |
|---|---|---|---|
| 3,005,929 | 10/1961 | Reichert | 315/30 |
| 3,071,651 | 1/1963 | Frankel | 179/15 AA |
| 3,307,044 | 2/1967 | Furukawa | 307/246 |
| 3,459,992 | 8/1969 | Griffey | 315/22 |
| 2,997,602 | 8/1961 | Hamburger et al. | 307/246 |
| 3,157,797 | 11/1964 | Eshelman | 307/246 |
| 3,171,984 | 3/1965 | Eshelman et al | 307/255 |

*Primary Examiner*—Robert L. Griffin
*Assistant Examiner*—Richard P. Lange
*Attorney*—James O. Harrell and John R. Manning

[57] ABSTRACT

The disclosed embodiment of the present invention is a CRT blanking and brightness control circuit which employs an amplifier stage responsive to a square wave input signal and having an output connected to the cathode of a CRT, a wave shaping circuit connected to the load impedance of the amplifier stage, and a level control circuit connected to the output of the amplifier stage. The wave shaping circuit is responsive to the trailing edge of the input signal for discharging the stray capacitance associated with the load impedance to effect a fast rise time of the signal at the output of the amplifier stage. The level control circuit is operable to vary the amplitude of the amplifier stage output which is applied to the cathode of the CRT.

2 Claims, 2 Drawing Figures

Figures 1, 2:
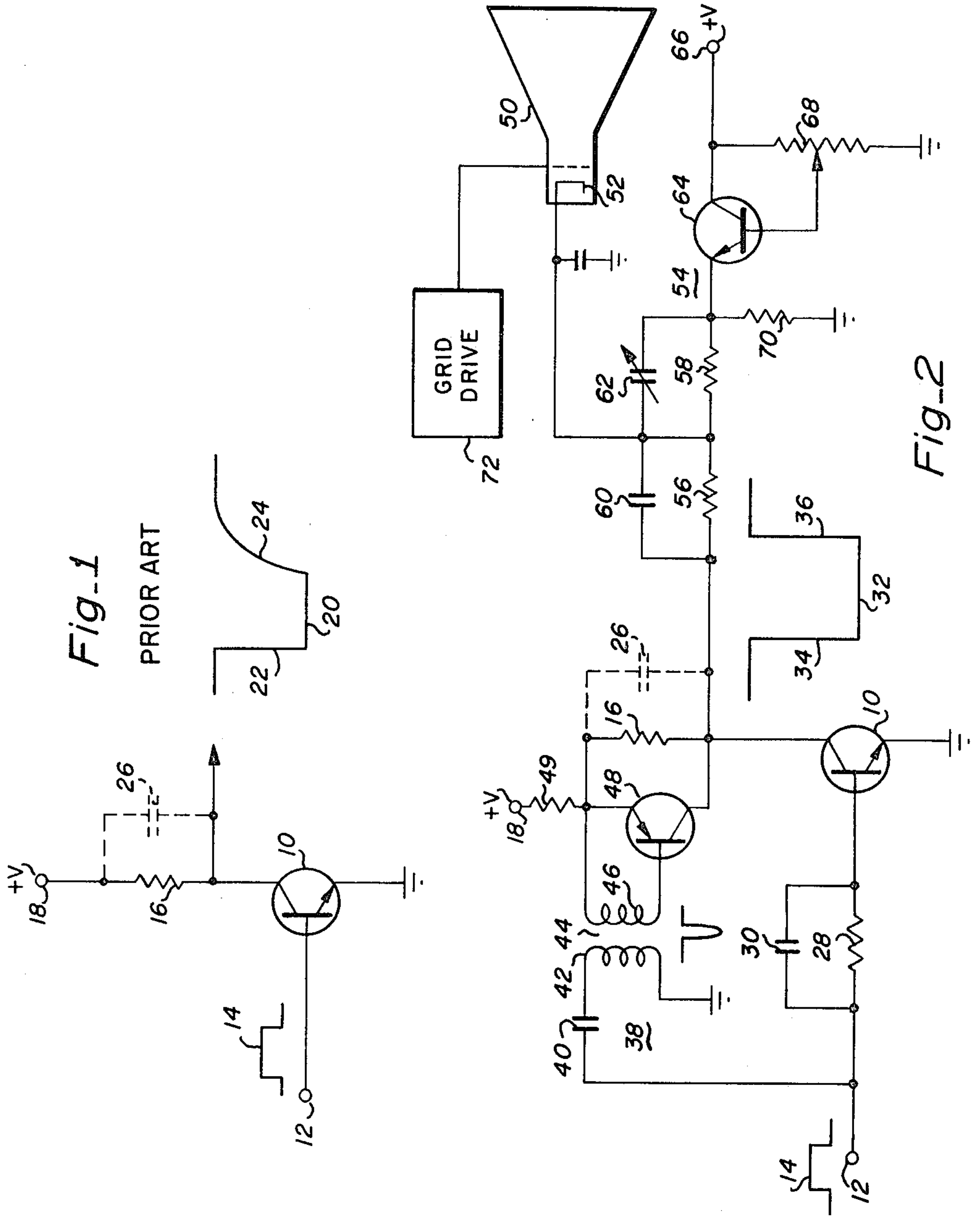

INVENTORS
ROBERT L. PETERS
BY KENNETH F. KOCH

THEIR ATTORNEY

CRT BLANKING AND BRIGHTNESS CONTROL CIRCUIT

This invention relates generally to a switching circuit and more particularly to a CRT blanking and brightness control circuit having a high switching speed. The present invention has particular application in the control of a CRT beam, but may be employed in any circuit which requires a fast switching time.

One of the major problems encountered in the design of switching circuits is that of providing relatively fast rise times of the output signal. A switching circuit is intended to cause a change from one state to another state without any lapse of time during the transition. However, it has been found that the transition between two states or levels cannot be effected without the passage of time, particularly when the difference between the two levels is relatively large.

The difficulty of achieving fast rise times is aggravated when a switching pulse must be amplified. Any circuitry employed for amplifying the switching pulse will tend to increase the rise or transition times thereof. This condition is primarily the result of the stray capacitance which exists in the leads and other circuit elements between the source of voltage and the switching or amplifying element. Either before or during the pulse interval while the switching element is conductive, the stray capacitance accumulates a charge. During the transition period from one state to the other state, the stray capacitance prevents the output of the switching element from attaining the ultimate level within a relatively short time period.

Therefore, a need exists for a switching circuit which can develop relatively high amplitude output pulses with relatively fast rise times of the leading and trailing edges thereof. Since relatively low amplitude switching pulses with relatively fast rise times can be easily attained, a particular need exists for an amplifier circuit for such a switching pulse which can provide an output pulse with relatively fast rise times. Accordingly, the present invention provides a wave shaping circuit connected to the load impedance of a square wave amplifier for reinforcing either the leading or trailing edge of the square wave pulse, thereby decreasing the rise time of the pulse developed at the output of the amplifier.

It is, therefore, an object of the present invention to provide a switching circuit which develops an output pulse having relatively fast rise times.

Another object of the present invention is to provide means for discharging the voltage developed on the stray capacitance inherent in an amplifier circuit or switching circuit during the transition from one switching state to another switching state.

A feature of the present invention resides in the provision of a switching element connected in parallel with the load impedance of a square wave amplifier and responsive to either the leading or trailing edge of a square wave input pulse to discharge any voltage developed on the stray capacitance associated with such load impedance during the change in conduction levels of the amplifier. Another feature of the present invention, when employed in combination with a CRT, resides in the provision of a brightness control circuit connected to an output of the switching circuit for varying the amplitude of the pulse supplied to the control element of the CRT. The brightness control circuit is constructed in accordance with the principles of the present invention to permit remote adjustment of the brightness level of the CRT. A distinct advantage of the present invention is that the drive for the grid of the CRT can be referenced to ground potential which permits clamping to ground and reduces or eliminates the effects of a floating grid.

These and other objects, features and advantages of the present invention will be more fully realized and understood from the following detailed description when taken in conjunction with the accompanying drawing wherein:

FIG. 1 is a schematic diagram of a switching or amplifying circuit known in the prior art for controlling a CRT; and FIG. 2 is a schematic diagram of a circuit which provides relatively fast switching times and is constructed in accordance with the principles of the present invention.

Like reference numerals throughout the various views of the drawing are intended to designate the same or similar elements.

With reference to FIG. 1, there is shown a schematic diagram of a circuit normally employed in the prior art for amplifying a square wave and supplying such amplified square wave to the cathode of a CRT. The circuit includes a transistor 10 which is normally biased into a state of nonconduction. In the present exemplification, the transistor 10 is connected in a common emitter configuration. The base of the transistor 10 is connected to an input terminal 12 which is supplied with a square wave having a waveform such as that illustrated on the drawing and designated with the reference numeral 14. The emitter of the transistor 10 is connected to ground potential and the collector thereof is connected through a load resistor 16 to a source of voltage on a terminal 18. In response to the input signal on the terminal 12 an output signal having a waveform such as that illustrated on the drawing and designated with the reference numeral 20 is developed at the collector of the transistor 10.

When the input pulse 14, which is of relatively low amplitude, is applied to the base electrode, the transistor 10 will conduct for the time duration of the positive portion of the input pulse. The output signal 20 will normally be a high level voltage approximately equal to the voltage on the terminal 18 until the transistor 10 is rendered conductive, whereupon the output signal will drop abruptly to a level approximately equal to ground potential. When the transistor 10 is conductive, the impedance between the collector thereof and ground will be negligible. Consequently, the leading edge 22 of the output pulse 20 will be extremely sharp, since the collector of the transistor 10 will be substantially shorted to ground potential. However, the trailing edge 24 of the pulse 20 will have an unsatisfactory rise time due to an undesirable transient therein.

The undesirable transient producing the relatively poor rise time of the trailing edge 24 results from the stray capacitance which exists in the leads and other circuit elements between the low impedance power source connected to the terminal 18 and the collector electrode of the transistor 10. Such a stray capacitance is diagrammatically illustrated by the capacitor shown in dotted lines and designated with the reference numeral 26. During the pulse interval in which the transistor 10 is conductive, the stray capacitance 26 accumulates a charge. When the trailing edge of the input pulse appears, the transistor 10 is rendered nonconductive. However, upon the occurrence of the trailing edge of the input pulse and for a transient period thereafter, the charge developed on the stray capacitance 26 prevents the collector of the transistor 10 from achieving a level equal to the voltage on the terminal 18. In effect, an RC time constant circuit is formed by the load impedance 16 and the stray capacitance 26. Consequently, the rise time of the trailing edge 24 is dependent upon the values of the resistor 16 and the stray capacitance 26.

When the circuit illustrated in FIG. 1 is employed for controlling the cathode voltage of a CRT for the purpose of turning the CRT beam ON and OFF, the rise time of the trailing edge 24 of the output pulse 20 is not satisfactory. The trailing edge 24 will not provide a sharp cutoff of the CRT beam as desired. Consequently, the amplifier or switching stage illustrated in FIG. 1 does not provide satisfactory operation. It can be readily appreciated that other amplifier or switching configurations will have the same disadvantage as the circuit illustrated in FIG. 1 or may have the disadvantage of a slow rise time on the leading edge of the output pulse. For example, an emitter follower configuration would produce an output pulse having a relatively slow rise time of the trailing edge.

The disadvantage realized by the above described circuits is overcome by the present invention which, in a broad sense, provides an auxiliary switching element for discharging the voltage developed on the stray capacitance in the circuit at the time of the transition from one state to another state. One embodiment of the present invention which accomplishes this result is illustrated in FIG. 2. As shown therein, the amplifier or switching stage is formed by the transistor 10 and the resistor 16 in an identical arrangement to that of the circuit illustrated in FIG. 1. The resistor 10 is normally nonconductive such that the collector voltage in the absence of an input pulse is approximately equal to the voltage applied at the terminal 18. The base of the transistor 10 is connected through a resistor 28 and capacitor 30 in parallel with one another to the input terminal 12. The resistor 28 prevents the transistor 10 from becoming undully saturated during the intervals of conduction. It has been found that as a transistor is rendered fully conductive and fully saturated, it is more difficult to switch the transistor into a state of nonconduction in a minimum transient time. Therefore, the resistor 28 and the frequency compensating capacitor 30 will hold the transistor 10 within a predetermined bounds during conduction to permit a relatively fast transition to a state of nonconduction at the termination of the input pulse 14.

The transistor 10 is biased into a state of conduction by the positive input pulse 14 which causes the collector voltage to drop substantially to ground potential in a relatively short time period. The change of collector voltage from a relatively high level to a relatively low level occurs in a short time period because the transistor 10, when conducting, provides a low impedance short to ground potential. Accordingly, an output pulse 32 is provided having a leading edge 34 which is identical to the leading edge 22 of the wave form 20.

In order to provide a fast rise time of the trailing edge 36 of the waveform 32, the input pulse 14 is employed for triggering a switching element which will discharge the stray capacitance 26 upon the occurrence of the trailing edge of the pulse 14. More particularly, the input pulse 14 is connected to a differentiating circuit 38 which is formed of a capacitor 40 and a primary winding 42 of a transformer 44 connected in series with one another. A secondary winding 46 of the transformer 44 is connected between the emitter and the base electrodes of a transistor 48. The emitter and collector electrodes of the transistor 48 are connected to opposite ends of the load resistor 16 and, consequently, to opposite ends of the stray capacitance 26. The differentiating circuit 38 differentiates the input pulse 14 to provide a positive going spike upon the occurrence of the leading edge of the pulse 14 and a negative going spike upon the occurrence of the trailing edge of the pulse 14. These spikes are transformer coupled to the base of the transistor 48 with the positive going spike having no effect on the conduction level thereof. The negative going spike, however, renders the transistor 48 conductive. Conduction of the transistor 48 provides a low impedance short circuit to the load resistor 16 and the stray capacitance 26, thereby discharging any voltage developed on the stray capacitance 26 such that the trailing edge 36 of the output waveform is substantially as abrupt as the leading edge 34.

The transistor 48 is normally nonconductive until the occurrence of the trailing edge of the input pulse of 14, at which time a negative going spike is applied to the base electrode thereof. At all other times, the base electrode of the transistor 48 remains at the same voltage level as the emitter electrode, since it is coupled to the emitter electrode through the winding 46 of the transformer 44. A resistor 49 is connected between the source of voltage on the terminal 18 and the emitter of the transistor 48. The value of resistor 49 is substantially less than the value of resistor 16 and serves to limit the current from the voltage source to ground potential when both transistors 10 and 48 are conducting. Therefore, the base electrode is normally maintained at a voltage level equal to the voltage applied at the terminal 18.

In actual practice, the circuit thus far described can be employed for controlling the electron beam of a CRT, which is shown in FIG. 2 and designated with the reference numeral 50. Although it is possible to connect the collector electrode of the transistor 10 directly to the cathode 52 of the CRT 50, in actual practice a brightness control circuit 54 is employed therebetween for controlling the level of bias supplied to the cathode 52. The brightness control circuit 54 includes two voltage dividing resistors 56 and 58 which are frequency compensated by capacitors 60 and 62 respectively. A transistor 64 has a collector electrode connected to a terminal 66 which is provided with a source of supply voltage, preferably equal to the voltage applied at the terminal 18. A bleeder rheostat 68 is connected between the terminal 66 and ground potential and includes a movable contact arm which is connected to the base electrode of the transistor 64.

The voltage dividing the resistors 56 and 58 are connected in series with one another between the collector of the transistor 10 and the emitter of the transistor 64. In addition, a resistor 70 is connected between the emitter of the transistor 64 and ground potential. The common connection between the resistors 56 and 58 is connected to the cathode 52 of the CRT 50. The movable contact arm of the rheostat 68 permits biasing of the base electrode of the transistor 64 at any point between ground potential and the level of voltage applied to the terminal 66. Adjustment of the rheostat 68 causes the entire pulse 32 to vary while maintaining approximately the same voltage difference between the high and low levels thereof. Consequently, a controllable bias is generated at the emitter electrode of the transistor 64 which can be varied by movement of the contact arm of the rheostat 68. The rheostat 68 can be remotely located, since the collector to base impedance of the transistor 64 is of a relatively high value. A grid drive 72 is connected to the grid of the CRT 50 and may include, for example, a video amplifier. It will be noted that the brightness control circuit 54 is not associated with the grid drive 72. This arrangement permits the high frequency video signal to be referenced to ground. If the video signal were combined with the pulse output of the brightness control circuit 54, relatively large currents would be created. In the actual practice of the present invention, the amplitude of the output pulse 32 was approximately equal to 150 volts. If the video signal is superimposed on a 150 volt pulse, extremely unstable conditions would be created. Consequently, the present invention provides a distinct advantage over other prior art circuits by the provision of the brightness control circuit in combination with the blanking circuit and isolated from the grid drive 72.

In many CRT applications, such as in commercial television receivers, complete blanking of the electron beam within the CRT is not necessary, nor is it employed in practice. If the present invention is intended to be employed as a film recorder, complete blanking of the electron beam is an absolute requirement. Consequently, not only is a large amplitude blanking pulse required, but such pulse must have extremely fast rise times of the leading and trailing edges.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:

1. A switching circuit including an amplifier stage responsive to a relatively low amplitude square wave signal to develop a relatively large amplitude square wave signal, said amplifier stage having stray capacitance therein, the improvement therewith comprising;

a. means connected to said amplifier stage for discharging the stray capacitance;

b. means responsive to the low amplitude square wave signal and connected to said discharging means for actuating said discharging means;

c. an amplitude control circuit including a voltage divider circuit having one end connected to the output of said amplifier stage; and d. means for applying a variable voltage connected to the other end of said voltage divider circuit for applying a variable voltage thereto.

2. A CRT biasing circuit comprising:

a. an amplifier stage including a load impedance connected to a source of voltage and having an input and an output;

b. means connecting a square wave signal to the input of said amplifier stage;

c. means connected between the source of voltage and the output of said amplifier stage for discharging any stray capacitance in response to a change from one amplitude level to another amplitude level of the square wave signal;

d. a voltage divider circuit having one end connected to the output of said amplifier stage; and e. means connecting a variable voltage to the other end of said voltage divider circuit.

* * * * *